United States Patent [19]

Szabo et al.

[11] Patent Number: 5,393,981
[45] Date of Patent: Feb. 28, 1995

[54] APPARATUS FOR THE SIMULTANEOUS SELECTIVE DETECTION OF NEUTRONS AND X OR GAMMA PHOTONS AND DETECTION SYSTEM USING SAID APPARATUS

[75] Inventors: Jean-Louis Szabo, Bagnolet; Georges Daniel, Palaiseau, both of France

[73] Assignee: Commissariat a l'Energie Atomique, Paris, France

[21] Appl. No.: 177,301

[22] Filed: Jan. 4, 1994

[30] Foreign Application Priority Data

Jan. 6, 1993 [FR] France ................... 93 00055

[51] Int. Cl.⁶ ................. G01T 1/20; G01T 3/06
[52] U.S. Cl. ..................... 250/367; 250/368
[58] Field of Search ............ 250/390.11, 370.11, 250/370.05, 367, 368

[56] References Cited

U.S. PATENT DOCUMENTS

| | | |
|---|---|---|
| 2,994,769 | 9/1961 | Sun et al. |
| 3,566,118 | 11/1968 | Peters. |
| 3,967,122 | 6/1976 | Ashe et al. ............ 250/367 X |
| 3,988,586 | 10/1976 | Stuart et al. |
| 4,217,497 | 8/1980 | Daniels et al. ............ 250/369 |
| 4,247,774 | 1/1981 | Brooks. |
| 4,482,808 | 11/1984 | Tominaga et al. ............ 250/392 |
| 4,687,683 | 8/1987 | Ishii et al. ............ 250/368 |
| 4,829,185 | 5/1989 | Cerff. |
| 4,884,288 | 11/1989 | Sowerby ............ 378/51 |
| 5,155,366 | 10/1992 | Miller ............ 250/367 |

FOREIGN PATENT DOCUMENTS 2-74890 3/1990 Japan ............ 250/367

OTHER PUBLICATIONS

Chiles, et al., "Multi-Energy Neutron Detector For Counting Thermal Neutrons, High-Energy Neutrons, and Gamma Photons Separately" pp. 1348-1350, *IEEE Transactions on Nuclear Science*, vol. 37, No. 3 (1990) Jun., New York.

Chiles et al., "High-Efficiency Scintillation Detector for Combined of Thermal and Fast Neutrons and Gamma Radiation" Reg. No. H590, (1989) Feb., Washington D.C.

*Primary Examiner*—Constantine Hannaher
*Assistant Examiner*—Edward J. Glick
*Attorney, Agent, or Firm*—Burns, Doane, Swecker & Mathis

[57] ABSTRACT

An apparatus for the simultaneous, selective detection of neutrons and X or gamma photons including a photomultiplier, a first scintillator sensitive to the neutrons and a second scintillator sensitive to the x or gamma photons. The apparatus also includes an attenuating light guide (situated between the first and second scintillators) for guiding the photons produced by the first scintillator to the photomultiplier and for attenuating the radiation associated with these photons. The attenuating light guide facilitates the separation of the energy bands associated with each of the first scintillator, the second scintillator and the background noise of the photomultiplier. By separating energy bands, detection of each radiation element is less complex. The apparatus also includes a neutron filter (situated between the attenuating light guide and the second scintillator) which functions to reduce the occurrence of neutrons interacting with the second scintillator, thus facilitating energy band separation.

7 Claims, 1 Drawing Sheet

APPARATUS FOR THE SIMULTANEOUS SELECTIVE DETECTION OF NEUTRONS AND X OR GAMMA PHOTONS AND DETECTION SYSTEM USING SAID APPARATUS

FIELD OF THE INVENTION

The invention relates to the field of the simultaneous, selective detection of flows of neutrons and gamma or X photons, particularly for nuclear diagraphy and measurements of the specific burn-up on irradiated fuel assemblies.

BACKGROUND OF THE INVENTION

The detection of neutrons in the presence of a large gamma photon flow has always been difficult. One of the processes used in the prior art consists of using detectors such as $^{10}BF$, $^{3}He$ proportional counters, intrinsically disturbed by high X or gamma dose rates and surrounding them with a shield which is effective with respect to said radiation.

Another process consists of using fission chambers insensitive to said radiation, but which have a limited efficiency for neutrons.

It is often necessary to simultaneously detect emissions of neutrons and X or gamma photons from a radiation source. This is generally carried out in the prior art by using two detectors, one for the neutrons and the other for the X or gamma photons.

The prior art in this field is e.g. illustrated by FR-A-2 317 668 and DE-A-1 564 271. These two documents relate to an apparatus effectively using two detectors, one for the neutrons and the other for the photons, both producing visible photons by scintillation, said two detectors being associated with the same photomultiplier.

The problem of this selective detection consequently consists of using means making it possible, from among the scintillations taken into account by the photomultiplier, to obtain a selection of those due to the neutrons and of those due to the X or gamma photons.

In the prior art, the selection of the scintillations respectively relative to said two radiation categories takes place at the scintillator outlet by a processing of the signal using the special, distinctive characteristics of said same scintillations as a function of whether they are due to neutrons or photons.

Essentially this discrimination takes place either on the rise time of the pulses (in FR-A-b 2 317 668), or on the decay time differences of the pulses emitted by the two scintillators (DE-A-1 564 271). In both cases, this signal processing phase leads to complex spectrometric electronics and to expensive equipment.

Another document, "United States Statutory Invention Registration", No. H590, described a scintillation detector sensitive both to neutrons and to gamma rays as a result of the presence of two scintillators, namely an external scintillator for the thermal neutrons and an internal scintillator for the fast neutrons and gamma photons.

However, in the aforementioned prior art, discrimination takes place in the output electronic system by pulse shape measurements and the counting of the pulses one by one following selection, i.e. using complex and expensive equipment.

It is for this reason that in said detector, the scintillator sensitive to the gamma photons is a plastic scintillator which, by its very nature, is unable to supply photoelectric peaks usable in amplitude spectrometry.

SUMMARY OF THE INVENTION

The present invention is directed at an apparatus for the simultaneous, selective detection of neutrons and X or gamma photons making it possible with the aid of means, which are simple to obtain, to completely separate the two scintillation types using a single spectrometric measurement system with two energy channels, whereof each corresponds to one of the two scintillation types to be separated.

The apparatus according to the invention comprises a detector having a first scintillator which is sensitive to neutrons and which does not produce X or gamma photons by interaction with said neutrons and a second scintillator sensitive to X or gamma photons, said detector being associated with a photomultiplier means, characterized in that the second scintillator is inorganic and monocrystalline and the apparatus also has a guidance and attenuation means for on the one hand guiding to the photomultiplier means the light photons, which are produced by the first scintillator under the impact of neutrons and on the other hand reducing the intensity of the radiation constituted by said photons, which are produced by the first scintillator, said guidance and attenuation means thus shifting towards the low energies the amplitude spectrum of the scintillations due to the neutrons supplied by the photomultiplier means and in that the first scintillator, the second scintillator and the guidance and attenuation means are chosen in such a way that the scintillations due to the neutrons and the photoelectric peak of the scintillations due to the X or gamma photons are in energy bands clearly separated on the one hand from one another and on the other from the electronic background noise of the photomultiplier means.

The first scintillator can be constituted by a glass scintillator, which induces reactions (n, alpha), e.g. a lithium 6 doped glass. In this case, the thermal neutrons are detected by means of the reaction (n, alpha) of lithium 6.

The alpha particle and the triton resulting from the reaction are emitted in opposite directions with respective energies of 2.05 MeV and 2.74 MeV.

Due to the fact that the average free passage of the thermal neutrons is generally approximately 1 mm for glass, it is possible to obtain very high neutron detection efficiencies with relatively limited glass thicknesses.

A very good protection of the X or gamma scintillator is obtained due to the absence of gamma trapping photons in the lithium 6/neutron interaction.

The use of an inorganic, monocrystalline scintillator as the second scintillator enables the latter to supply a photoelectric peak usable with a spectrometric system.

This second scintillator can use a scintillating material chosen from within the group including bismuth germanate (BGO), cesium iodide (CsI), cesium fluoride (CsF), sodium iodide (NaI) and gadolinium orthosilicate (GSO).

The dimensions of the second scintillator are calculated as a function of the energies of the incident gamma or X photons and the absorption mass coefficients of said second scintillator in order to obtain the best possible efficiency.

The guidance and attenuation means can be placed between the first scintillator and the second scintillator.

Preferably, the apparatus according to the invention also comprises a means for absorbing neutrons in order to protect the second scintillator against said neutrons.

According to a special embodiment of the apparatus according to the invention, the guidance and attenuation means is placed between the first scintillator and the second scintillator and the neutron absorption means is placed between the guidance and attenuation means and the second scintillator.

It should be noted that the invention essentially relates to means for separating into two clearly separate energy bands scintillations relative to each of the two studied radiation types.

The applicant has shown that by using a guidance and attenuation means and optionally a neutron absorption means, as well as by an appropriate choice of the scintillating materials and the attenuation guidance means, that it was possible to precisely locate in two energy bands separated from one another and from the background noise, the scintillations due to the X or gamma photons and the scintillations due to the neutrons.

The guidance and attenuation means can be tuned to the mean energy band of the light scintillations of the scintillator sensitive to the neutrons in order to convert said band into a similar band in an energy range clearly separate from the emission band of the scintillator sensitive to the X or gamma photons and the electronic background noise of the photomultiplier means.

The considerable advantage resulting from the use of the invention is that the two scintillation channels are identified and clearly separated, so that the spectrometric measurement system can be greatly simplified and can be formed from an inexpensive, standard equipment.

The present also invention also relates to a system for the simultaneous, selective detection of neutrons and X or gamma photons, said system being characterized in that it comprises the apparatus also forming the object of the invention, a light reflector of limited thickness, which is transparent to neutrons and to X or gamma photons, which covers the apparatus and whose reflecting surface is turned towards the latter, an optical confinement enclosure covering said light reflector and ensuring the sealing of the apparatus with respect to the outside, a photomultiplier means associated with the detector of the apparatus, an optical coupler through which the photomultiplier means is associated with the detector and a dual channel spectrometric measuring system located at the outlet of the photomultiplier means and separately performing in each channel the respective counting of the scintillations due to the neutrons and the scintillations due to the X or gamma photons.

Finally, the photomultiplier means can either be a photomultiplier in the conventional sense of the term, or a photodiode.

The invention is described in greater detail hereinafter relative to non-limitative embodiments and with reference to the attached drawings, wherein show:

DETAILED DESCRIPTION

Figure 1:
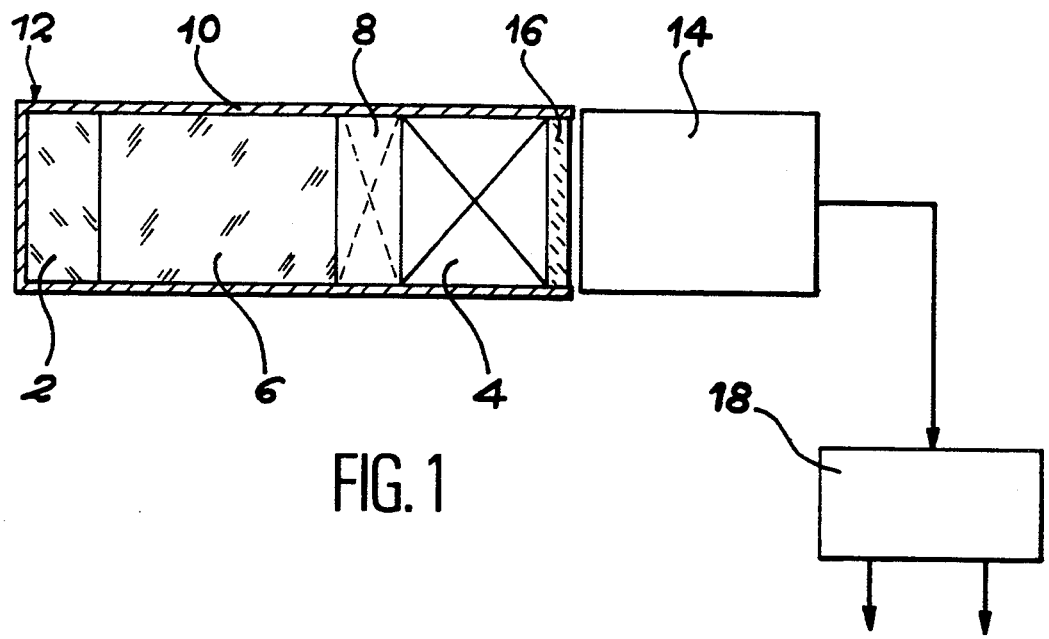
FIG. 1 A diagrammatic longitudinal sectional view of an embodiment of the detection system according to the invention.

FIG. 1 diagrammatically shows a system according to the invention and which includes:
- a lithium 6 doped glass first scintillator 2,
- a second scintillator 4 sensitive to X or gamma photons, the scintilator 2 serving as a neutron-sensitive scintillator and also to protect the scintillator 4 against neutrons propagating in accordance with the axis common to the scintillators 2 and 4 and which can interact with the scintillator 4,
- a light guide 6 placed between the scintillators 2 and 4 and which contributes to bringing about a distribution of the scintillation peaks of the neutrons on the one hand and the X or gamma photons on the other in the separate energy channels, as will be explained hereinafter,
- optionally a means for absorbing neutrons or neutron filter 8, e.g. made from lithium 6 doped glass and placed between the guide 6 and the scintillator 4 and which provides a supplementary neutron protection for the X or gamma photon scintillator 4.

The assembly is enclosed in a reflecting envelope 10, whose reflecting portion is turned towards the scintillators so as to avoid any light energy losses by leaks to the outside.

The reflecting envelope 10 is in turn enclosed in a mechanical and optical confinement enclosure 12 sealing the assembly with respect to the outside.

The materials forming the scintillator 4, the guide 6 and the filter 8 must be able to transmit the light produced by the interaction of the neutrons with the scintillator 2.

FIG. 1 also shows a photomultiplier 14 and an optical coupler 16 ensuring the good transmission of light scintillations from the scintillators towards said photomultiplier 14.

On the one hand the light guide 6 guides towards the photomultiplier the light produced by interaction of the neutrons with the scintillator 2 (said light reaching the photomultiplier after traversing the filter 8, the scintillator 4 and the coupler 16) and on the other hand attenuates said light (this increasing in proportion with the length of the guide), so that there is a shift towards the low energies of the amplitude spectrum of the scintillations due to the neutrons, which is supplied by the photomultiplier.

Finally, at the outlet of the photomultiplier 14 is provided a dual channel spectrometric measurement system 18 preset once and for all on the two energy bands in which the system restores the scintillation count informations.

Figure 2:
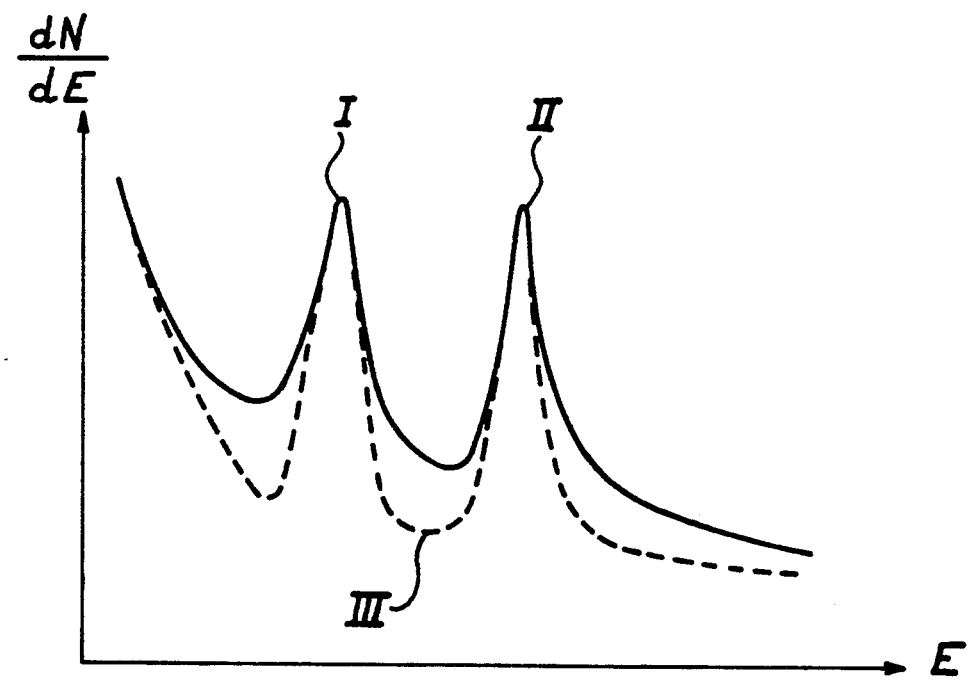
FIG. 2 A drawing of the amplitude spectrum of the scintillations due to the neutrons and to the X or gamma photons, showing the respective arrangement of the different peaks and obtained with an apparatus according to the invention.

FIG. 2 shows the amplitude spectra of the scintillations due to the neutrons (spectrum I) and due to the X or gamma photons (spectrum II) for an apparatus according to the invention and in accordance with FIG. 1, but without a neutron filter.

The number dN/dE of pulses counted by the energy units is represented on the ordinate and the energy E on the abscissa. The dotted line curve III relates to spectra resulting from the addition of a neutron filter to said apparatus. It can be seen that this neutron filter makes it possible to reduce the background noise of the previously formed spectra.

Reference will now once again be made to the apparatus. The spectrum due to the X or gamma photon scintillator has a peak, which it is not wished to modify. This scintillator is initially chosen so that the corresponding peak is beyond that corresponding to the assembly of the neutron-sensitive scintillator and the light guide.

Then by an adequate adjustment of the light guide and the possible use of a neutron filter (e.g. of lithium 6 doped glass), which can reduce the parasitic background noise (neutrons) of the scintillator sensitive to the X or gamma photons, it is possible to ensure that the peak of the scintillations due to the neutrons is located in an energy channel clearly differentiated from that of the peak due to the X or gamma photons.

It should be noted that by modifying the thickness or length of the guide, there is a modification to the position of the peak due to the neutrons (whilst retaining the same surface beneath the peak). Thus, it is possible to move this peak away from that due to the X or gamma photons.

It should also be noted that the neutron filter also absorbs a certain fraction of the intensity of the light radiation produced in the lithium 6 doped glass scintillator by interaction with the neutrons and that said neutron filter participates, with the light guide and with a reduced effect, in the energy shift of the spectrum of the scintillations due to the neutrons.

The photocathode of the photomultiplier also participates in this shift, in accordance with the response curve of said photocathode.

It is then clear that it is merely necessary to have a dual channel spectrometric system for performing the count of the number of scintillations due to each radiation type.

In addition, this can be carried out with standard equipment, preset once and for all, and much simpler and less expensive than the signal processing means used in the prior art for making the selection between the two origins of simultaneous scintillations.

In a purely indicative and non-limitative manner, an apparatus according to the invention can comprise:
- a $^6$Li doped glass scintillator with a diameter of 1½" (38 mm) and a thickness of 2 mm,
- a glass guide with a diameter of 1½" (38 mm) and with a thickness between 100 and 150 mm,
- a BGO scintillator with a diameter of 1½" (38 mm) and with a thickness of 1" (25.4 mm),
- optionally a $^6$Li doped glass neutron filter with a diameter of 38 mm and a thickness of 2 mm.

The invention has a large number of possible applications such as, e.g.:
- simultaneous measurements using interactions of neutrons and X or gamma photons with material, in the industrial, geological and mining fields (density-/humidity, weight/humidity and thickness/humidity gauges, as well as neutron and/or gamma diagraphs),
- the monitoring of movements of irradiated fuel assemblies in reprocessing plants,
- the measurement of the specific burn-up of irradiated fuel assemblies,
- the production of nuclear fuel elements,
- the reprocessing of irradiated nuclear fuel elements, enrichment plants and
- in general terms, any measurement in which neutrons and X or gamma photons are associated with a need for separate counting.

We claim:

1. Apparatus for the simultaneous selective detection of neutrons and X or gamma photons said apparatus comprising a detector incorporating: a first scintillator (2) which is sensitive to neutrons and which does not produce X or gamma photons by interaction with said neutrons and a second scintillator (4) sensitive to X or gamma photons, said detector being associated with a photomultiplier means (14), characterized in that the second scintillator (4) is organic and monocrystalline, in that the detector includes a guidance and attenuation means (6) for guiding to the photomultiplier means (14) the scintillations which are produced by the first scintillator (2) under the impact of neutrons and for reducing the intensity of the radiation constituted by said scintillations, said guidance and attenuation means thus lowering the energy of the amplitude spectrum of the scintillations due to the neutrons, said amplitude spectrum being supplied by the photomultiplier means and in that the first scintillator (2), the second scintillator (4) and the guidance and attenuation means (6) are chosen such that the peak of the scintillations due to the neutrons and the photoelectric peak of the scintillations due to the X or gamma photons are in energy bands clearly separated from one another and from the electronic background noise of the photomultiplier means.

2. Apparatus according to claim 1, characterized in that the first scintillator (2) is made from glass, which induces reactions (n, alpha).

3. Apparatus according to claim 1, characterized in that the second scintillator (4) comprises a scintillating material chosen from the group consisting of bismuth germanate (BGO), cesium iodide (CsI), cesium fluoride (CsF), sodium iodide (NaI) and gadolinium orthosilicate (GSO).

4. Apparatus according to claim 1, characterized in that the guidance and attenuation means (6) is placed between the first scintillator and the second scintillator.

5. Apparatus according to claim 1, characterized in that the detector further comprises a neutron absorption means (8) for protecting the second scintillator (4) against said neutrons.

6. Apparatus according to claim 5, characterized in that the guidance and attenuation means (6) is placed between the first scintillator (2) and the second scintillator (4) and in that the neutron absorption means (8) is placed between the guidance and attenuation means (6) and the second scintillator (4).

7. The apparatus according to claim 1, characterized in that the apparatus further includes: a light reflector, covering the detector which is transparent to neutrons and to X or gamma photons, for reflecting scintillations towards the photomultiplier means, an optical confinement enclosure (12) for covering said light reflector and for sealing the detector with respect to the outside, an optical coupler (16) for coupling the detector to the photomultiplier means and a dual channel spectrometric measuring system receiving signals from the photomultiplier means and for separately counting in each channel the scintillations due to the neutrons and the scintillations due to the X or gamma photons.

* * * * *